Jan. 7, 1941.   C. C. HARRINGTON   2,228,209
SUN VISOR FOR VEHICLES
Filed July 3, 1940
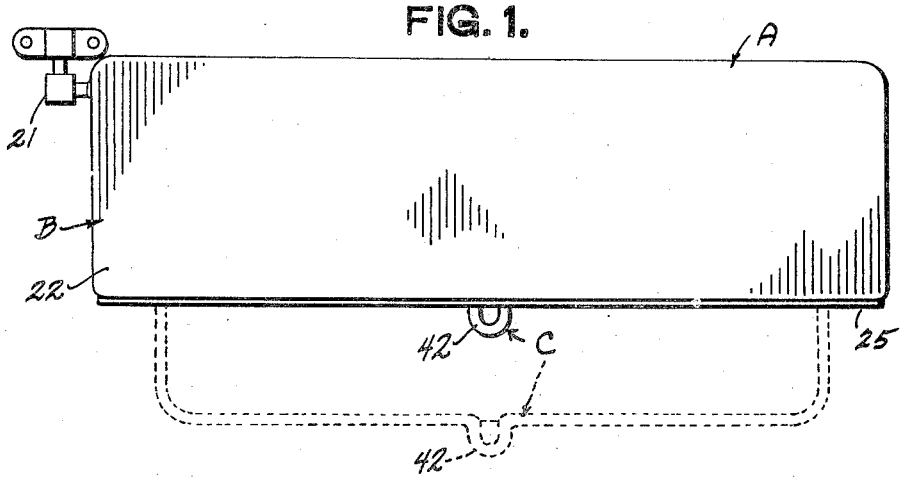
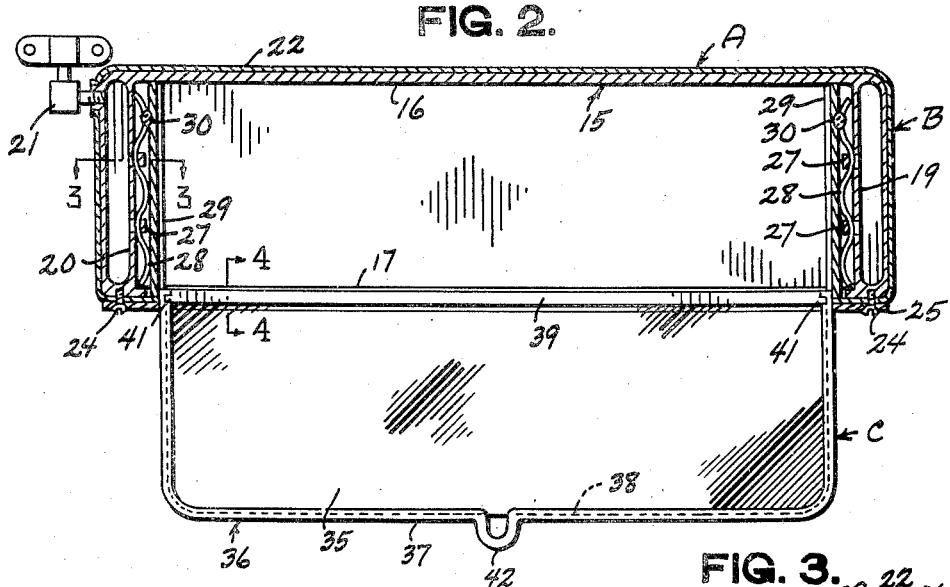
INVENTOR.
Charles C. Harrington
BY
ATTORNEYS.

Patented Jan. 7, 1941

2,228,209

UNITED STATES PATENT OFFICE 2,228,209

SUN VISOR FOR VEHICLES

Charles C. Harrington, Tulsa, Okla.

Application July 3, 1940, Serial No. 343,863

3 Claims. (Cl. 296—97)

The invention relates to improvements in glare screens for vehicles and more specifically to vehicle glare screens of the character which include a main shield and an extension shield.

One object of the invention is to provide a glare screen including a main shield and a slidably adjustable extension shield which may be readily set in an extended position relative to the lower side of the main shield whereby to afford added protection against glare from the sun or from the lights of approaching vehicles.

Another object of the invention is to provide a glare screen including a main shield and a slidably adjustable extension shield and wherein resilient means is provided to retain the extension shield against casual displacement from a set position relative to the main shield.

A further object of the invention resides in the provision of a glare screen including a main shield and a slidably adjustable extension shield wherein means is provided to prevent dissociation of the shields during adjustment of the extension shield.

Other objects and advantages of the invention will be apparent during the course of the following detailed description, taken in connection with the accompanying drawing, forming a part of this specification, and in which drawing, Figure 1 is a view in side elevation of my improved glare screen.

Figure 2 is a vertical longitudinal sectional view thereof, with the extension shield disposed in extended relation to the main shield.

Figures 3 and 4 are horizontal and vertical fragmentary sectional detail views respectively taken substantially on the lines 3—3 and 4—4 of Figure 2.

In the drawing, which for the purpose of illustration show only a preferred embodiment of the invention, and wherein similar reference characters denote corresponding parts thruout the several views, the letter A generally designates the glare screen, including a main shield B and an extension shield C.

Included in the main shield B is a frame 15 comprising an upper horizontal rail 16, a lower horizontal rail 17 provided with an elongate slot 18, an end member 19, and an opposite end member 20 provided with a suitable supporting bracket 21. Extending over the frame 15 is a covering 22 of opaque sheet material, having lower inturned marginal edges 23 subjacent the rail 17 and aligning with the side edges of the slot 18. Secured to the frame 15, as by screws 24 is a finishing strip 25 provided with a longitudinal slot 26 of a width less than that of the slot 18.

Along their insides, the end members 19, 20 are provided with spaced transverse loops 27, which may be formed integrally with the end members, as by stamping or pressing. Extending thru these loops 27 are serpentine springs 28 urging spaced parallel guide channels 29 toward one another. In the example shown, these channels 29 are secured to the upper end bights of the serpentine springs by welding 30.

Turning now to the extension shield C, this includes a substantially rectangular translucent panel 35, of any suitable material such as "Celluloid," "Cellophane" or colored silk. Bordering the panel 35 is a frame 36 including a substantially U-shaped portion 37 slidable thru the slot 26 in the finishing strip 25 into and out of the hollow interior of the main shield B. This U-shaped portion 37 along its inside is provided with a groove 38 in which the lower and side margins of the translucent panel 35 are seated. Bridging the free ends of the U-shaped portion 37 is an abutment strip 39 provided with a groove 40 in which the upper margin of the translucent panel is seated. In the example shown in Figure 2, the ends of the abutment strip 39 terminate in tongues 41 mortised into the free ends of the U-shaped portion 37. The width of the abutment strip 39 is greater than the width of the slot 26 in the finishing strip 25. The U-shaped portion 37 may be provided with a depending loop 42 constituting a handle or finger hold.

Upon assembly of the glare screen as shown in Figure 2, the springs 28 will urge the guide channels 29 into frictional engagement with the frame 36 so that the extension shield will be retained against casual displacement from any set position relative to the main shield. As shown in Figure 3, the insides of the guide channels 29 may be concavely rounded to receive the convexly rounded outsides of the frame 36. It will be readily observed that the extension shield C is mounted for slidable movement relative to the main shield B between retracted and extended positions and that the extension shield may not be unintentionally dissociated with the main shield during adjustment since engagement of the abutment strip with the finishing strip 25 will serve to limit the downward travel of the extension shield. However, by removing the screws 24 and detaching the finishing strip 25, the extension shield C may be readily separated from the main shield B for repair or replacement.

While I have shown a bracket 21 for supporting the glare screen A, it will of course be understood that the device may be attached to the vehicle body or to existing visor equipment on the vehicle body, by any suitable means.

Various changes may be made in the form of invention herein shown and described without departing from the spirit of the invention or the scope of the following claims.

I claim:

1. In a glare screen, a main frame having an elongate opening in a given side, a main shield carried by the main frame, an auxiliary frame including a U-shaped member provided along its inside with a groove, an auxiliary shield formed of thin sheet material and seated in the groove, an abutment strip releasably interfitted with the free ends of the U-shaped member and holding said auxiliary shield in said groove, said auxiliary frame being movable through said elongate opening, and a finishing strip releasably secured to the given side of the main frame, said strip being provided with an opening of a size permitting withdrawal of the U-shaped member therethrough, said abutment strip engaging said finishing strip upon withdrawal of the U-shaped member to prevent separation of the auxiliary shield from the main shield.

2. In a glare screen, a main frame having an elongate opening in a given side, a main shield formed of flexible sheet material carried by the main frame and terminating in marginal edges bounding said elongate opening, an auxiliary frame provided with a lateral abutment slidable through said opening, an auxiliary shield mounted within the auxiliary frame, and a finishing strip releasably secured to the given side of the main frame in binding relation to the marginal edges of said main shield, said strip being provided with an opening of a size permitting withdrawal of the auxiliary frame, said abutment engaging said finishing strip upon withdrawal of the auxiliary frame to prevent separation of the auxiliary shield from the main shield.

3. In a glare screen, a main frame having an elongate opening in a given side, a main shield carried by the main frame, an auxiliary frame including a U-shaped member provided along its inside with a groove, an auxiliary shield seated in the groove, an abutment strip releasably interfitted with the free ends of the U-shaped member and holding said auxiliary shield in said groove, said auxiliary frame being movable through said elongate opening, resilient guide means in the main frame frictionally engaging the opposite ends of the U-shaped member to prevent undesired movement thereof and to hold the abutment strip in interfitted relation to the U-shaped membed, and a finishing strip releasably secured to the given side of the main frame, said strip being provided with an opening of a size permitting withdrawal of the U-shaped member therethrough, said abutment strip engaging said finishing strip upon withdrawal of the U-shaped member to prevent separation of the auxiliary shield from the main shield.

CHARLES C. HARRINGTON.